United States Patent
Yamauchi et al.

(10) Patent No.: US 11,823,222 B2
(45) Date of Patent: Nov. 21, 2023

(54) POWER SUPPLY/DEMAND MANAGEMENT DEVICE AND POWER SUPPLY/DEMAND ADJUSTING METHOD

(71) Applicant: Prime Planet Energy & Solutions, Inc., Tokyo (JP)

(72) Inventors: Yutaka Yamauchi, Himeji (JP); Jun Asakura, Kakogawa (JP); Hideki Sakata, Nishinomiya (JP); Hideyuki Nagai, Nagoya (JP); Masanori Iechika, Toyota (JP); Yasuhiko Ikeda, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/862,404

(22) Filed: Jul. 12, 2022

(65) Prior Publication Data

US 2023/0116812 A1    Apr. 13, 2023

(30) Foreign Application Priority Data

Jul. 14, 2021    (JP) ................................ 2021-116387

(51) Int. Cl.
G06Q 30/02        (2023.01)
G06Q 30/0207     (2023.01)
(Continued)

(52) U.S. Cl.
CPC .......... G06Q 30/0215 (2013.01); B60L 50/60 (2019.02); B60L 53/665 (2019.02);
(Continued)

(58) Field of Classification Search
CPC .. G06Q 30/0215; G06Q 50/06; B60L 53/665; H02J 7/005
See application file for complete search history.

(56) References Cited

U.S. PATENT DOCUMENTS

| 10,752,128 B1* | 8/2020 | Langton ................. B60L 58/16 |
| 2011/0078092 A1* | 3/2011 | Kim ..................... B60L 53/305 320/109 |

(Continued)

FOREIGN PATENT DOCUMENTS

| JP | 2011-175556 A | 9/2011 |
| JP | 2018-161023 A | 10/2018 |

(Continued)

OTHER PUBLICATIONS

"Charge coordination and battery lifecycle analysis of electric vehicles with V2G implementation" (Sufyan M., et al.—published in Electric Power Systems Research vol. 184, Jul. 2020) (Year: 2020).*

*Primary Examiner* — James M Detweiler
(74) *Attorney, Agent, or Firm* — HAUPTMAN HAM, LLP

(57) ABSTRACT

A power supply/demand management device includes: a battery health acquisition controller configured or programmed to acquire a battery health X of the storage battery; a power selling amount management controller configured or programmed to acquire a desired power selling amount and correct desired power selling amount based on the battery health X acquired by the battery health acquisition controller; a power transmission/reception management controller configured or programmed to manage an amount of received/transmitted power between the storage battery and the power transmission/distribution system, based on the corrected power selling amount; and an incentive management controller configured or programmed to calculate an incentive to be provided to the user of the storage battery based on the corrected power selling amount.

6 Claims, 7 Drawing Sheets

(51) Int. Cl.
*H02J 7/00* (2006.01)
*B60L 53/66* (2019.01)
*B60L 50/60* (2019.01)
*B60L 58/16* (2019.01)
*G06Q 50/06* (2012.01)

(52) U.S. Cl.
CPC .............. *B60L 58/16* (2019.02); *G06Q 50/06* (2013.01); *H02J 7/005* (2020.01); *H02J 7/0063* (2013.01)

(56) References Cited

U.S. PATENT DOCUMENTS

| | | |
|---|---|---|
| 2011/0208637 A1 | 8/2011 | Wakita et al. |
| 2012/0150709 A1* | 6/2012 | Kaji ........................ G06Q 40/00 705/35 |
| 2012/0249068 A1 | 10/2012 | Ishida |
| 2017/0267115 A1* | 9/2017 | Unno ...................... B60L 58/13 |
| 2019/0386511 A1 | 12/2019 | Takahashi et al. |
| 2020/0091752 A1* | 3/2020 | Esaka ..................... B60L 55/00 |
| 2020/0353839 A1* | 11/2020 | Tarchinski .............. B60L 58/12 |
| 2021/0135484 A1 | 5/2021 | Waite |
| 2021/0170903 A1 | 6/2021 | Tsuchiya et al. |
| 2021/0255251 A1 | 8/2021 | Ukumori |
| 2022/0297568 A1* | 9/2022 | Kinomura ............... B60L 58/10 |

FOREIGN PATENT DOCUMENTS

| | | |
|---|---|---|
| JP | 2018207590 A * | 12/2018 |
| JP | 6590029 B1 | 10/2019 |
| JP | 202042686 A | 3/2020 |
| JP | 6783190 B2 | 11/2020 |
| JP | 2021-093802 A | 6/2021 |
| WO | 2012/004897 A1 | 1/2012 |
| WO | 2019/215817 A1 | 11/2019 |

* cited by examiner

POWER SUPPLY/DEMAND MANAGEMENT DEVICE AND POWER SUPPLY/DEMAND ADJUSTING METHOD

CROSS REFERENCE TO RELATED APPLICATIONS

This application claims the benefit of priority to Japanese Patent No. 2021-116387 filed on Jul. 14, 2021. The entire contents of this application are hereby incorporated herein by reference.

BACKGROUND

The technique disclosed here relates to a power supply/demand management device for use in adjusting power supply and demand of a power transmission/distribution system.

In recent years, there has been proposed a technique for adjusting power supply and demand with which a general user is participate in adjusting a power supply/demand balance in a power transmission/distribution system managed by, for example, an electric power company, and in return, the user receives an incentive (e.g., money or points). In this method for adjusting power supply and demand, when power shortage occurs in the power transmission/distribution system, a request for power supply is issued to a user having a large-size storage battery capable of being repeatedly charged and discharged. If the user accepts the request, the user connects his/her storage battery to a power supply/demand management device, and supplies electric power to the power transmission/distribution system through the power supply/demand management device. Then, the power supply/demand management device provides the user with an incentive according to the supplied electric power. An example of the power supply/demand management device for use in the method for adjusting power supply and demand is disclosed in Japanese Patent Application Publication No. 2020-42686. A series of processes concerning power supply and incentive grant will be hereinafter referred to as a "power selling process."

A power supply/demand management device described in Japanese Patent Application Publication No. 2020-42686 includes a state information acquisition unit for acquiring state information indicating a current state of a storage battery, a performance calculation unit for calculating a performance index (the degree of deterioration of the storage battery) indicating a consumption degree of a storage battery from the state information, and an incentive imparting unit for imparting an incentive according to a value of the performance index to a provider who provides a storage battery as a power demand/supply adjustment means of a power transmission/distribution system. In this power supply/demand management device, a high incentive is imparted to a user having a storage battery showing a high deterioration degree. This encourages a user who hesitates to perform a power selling process because of deterioration of a storage battery to participate in power supply/demand adjustment.

SUMMARY

As described above, with the technique described in JP2020-42686A, a user who is excessively worried about deterioration of a storage battery is encouraged to participate in power supply/demand adjustment. On the other hand, some users having storage batteries are indifferent to deterioration of the storage batteries. Such a user might place too much importance on acquisition of an incentive by selling electric power and might perform an excessive power selling process that can cause rapid deterioration of a storage battery. Such an excessive power selling process performed to a deterioration state of a storage battery can cause rapid progress of deterioration of the storage battery. In another case, an excessively small power selling process might be conducted to a deterioration state of a storage battery so that a demand for power supply from a power transmission/distribution system cannot be appropriately satisfied.

To solve the problems described above, the technique disclosed here provides a power supply/demand management device with the following configuration. A power supply/demand management device disclosed here is a power supply/demand management device configured or programmed to manage power supply and demand between a power transmission/distribution system and a storage battery. The power supply/demand management device includes: a battery health acquisition controller configured or programmed to acquire a battery health $X$ of the storage battery; a power selling amount management controller configured or programmed to acquire a desired power selling amount and correct desired power selling amount based on the battery health $X$ acquired by the battery health acquisition controller, thereby calculating a corrected power selling amount, the desired power selling amount being an amount of electric power set by a user of the storage battery and being to be supplied from the storage battery; a power transmission/reception management controller configured or programmed to manage an amount of received/transmitted power between the storage battery and the power transmission/distribution system, based on the corrected power selling amount; and an incentive management controller configured or programmed to calculate an incentive to be provided to the user of the storage battery based on the corrected power selling amount.

In the power supply/demand management device described above, the desired power selling amount set by the user of the storage battery is corrected based on the battery health $X$, and an appropriate corrected power selling amount is calculated. That is, even in a case where a user sets a desired power selling amount not the matching battery health $X$ of his/her storage battery, an appropriate corrected power selling amount is calculated, and the corrected power selling amount is supplied from the storage battery. Accordingly, rapid deterioration of the storage battery can be suppressed, and a power supply/demand balance can be suitably adjusted.

In one aspect of the power supply/demand management device disclosed here, the power selling amount management controller stores a predetermined first threshold $X1$. The battery health $X$ acquired by the battery health acquisition controller and the first threshold $X1$ are compared, and if the battery health $X$ exceeds the first threshold $X1$, the corrected power selling amount may be calculated as a value obtained by adding an excess amount to the desired power selling amount. If the battery health $X$ is below the first threshold $X1$, the corrected power selling amount may be calculated as a value obtained by subtracting a subtraction amount from the desired power selling amount.

With this configuration, when an excessively small power selling amount is set to the acquired battery health $X$ of each storage battery, correction is performed to increase the power selling amount. On the other hand, when an excessively large power selling amount is set to the acquired battery health $X$ of each storage battery, correction is performed to reduce the power selling amount. Accordingly, a large amount of electric power is supplied from a storage battery with a high battery health X, and thus, power supply and demand required by the power transmission/distribution system can be efficiently satisfied. In a storage battery with a low battery health X, rapid deterioration of the storage battery caused by a power selling process can be suppressed.

In one aspect of the power supply/demand management device disclosed here, the power selling amount management controller stores a predetermined second threshold X2 as a value smaller than the first threshold X1. The battery health X acquired by the battery health acquisition controller and the second threshold X2 are compared, and if the battery health X is below the second threshold X2, the corrected power selling amount may be zero.

With this configuration, substantial power supply from a storage battery that is likely to deteriorate rapidly due to a power selling process is stopped. Accordingly, rapid deterioration of the storage battery is prevented.

In one aspect of the power supply/demand management device disclosed here, if the battery health X acquired by the battery health acquisition controller exceeds the first threshold X1, the incentive management controller may calculate an incentive to the desired power selling amount based on a first incentive grant rate. The incentive management controller may also calculate an incentive to the excess amount based on a second incentive grant rate higher than the first incentive grant rate.

With this configuration, a high incentive grant rate is set for an excess amount occurring if the battery health X of the storage battery is high. Thus, a user of a storage battery with a high battery health X is expected to be motivated to actively transmit electric power to the power supply/demand management device. Accordingly, a user of a storage battery with a high battery health X can be encouraged to sell electric power to the power supply/demand management device.

In one aspect of the power supply/demand management device disclosed here, the incentive management controller calculates a participation incentive to be provided to the user who sets the desired power selling amount.

With this configuration, even a user who does not know a battery health X of a storage battery can also be encouraged to sell electric power from the storage battery, and thus, power supply and demand requested by the power transmission/distribution system can be more favorably satisfied.

In one aspect of the power supply/demand management device disclosed here, the battery health X is a value based on at least one of a resistance increase rate, a capacity retention rate, or a temperature of the storage battery.

With this configuration, deterioration of the storage battery can be more effectively suppressed.

In one aspect of the power supply/demand management device disclosed here, the storage battery is mounted as a driving source on a vehicle, and is electrically connected to the storage battery through an electric circuit of the vehicle to thereby perform transmission and reception of electric power.

With the characteristics described above, electric power is sold in consideration of the battery health X of the storage battery, and thus, safety, for example, can be more favorably obtained for a vehicle using the storage battery as a driving source.

In another aspect, a power supply/demand adjusting method disclosed here is provided. A power supply/demand adjusting method disclosed here includes: acquiring a battery health X of the storage battery; acquiring a desired power selling amount, the desired power selling amount being an amount of electric power set by a user of the storage battery and being to be supplied from the storage battery to the power transmission/distribution system; correcting the desired power selling amount based on the battery health X acquired in the step of acquiring the battery health X, thereby calculating a corrected power selling amount; supplying electric power from the storage battery to the power transmission/distribution system based on the corrected power selling amount; and calculating an incentive to be provided to the user of the storage battery based on the corrected power selling amount.

With this method, even in a case where a user sets a desired power selling amount not matching the battery health X of his/her storage battery, an appropriate corrected power selling amount is calculated, and the corrected power selling amount is supplied from the storage battery. Accordingly, it is possible to achieve suppression of rapid deterioration of the storage battery and contribution to stabilization of a power supply/demand balance.

In one aspect of the power supply/demand adjusting method disclosed here, in the step of calculating the corrected power selling amount, the battery health X acquired in the battery health acquiring step and a predetermined first threshold X1 are compared, and if the battery health X exceeds the first threshold X1, the corrected power selling amount is calculated by adding an excess value to the desired power selling amount. In the step of calculating the corrected power selling amount, if the battery health X is below the first threshold X1, the corrected power selling amount may be calculated by subtracting a subtraction amount from the desired power selling amount.

With this method, a large amount of electric power is supplied from a storage battery with a high battery health X, and thus, power supply and demand can be suitably adjusted. For a storage battery with a low battery health X, rapid progress of deterioration of the storage battery due to a power selling process can be suppressed. Accordingly, rapid deterioration of a storage battery can be suppressed so that power supply and demand can be more suitably adjusted.

In one aspect of the power supply/demand adjusting method disclosed here, in the step of calculating the corrected power selling amount, the battery health X acquired in the battery health acquiring step and a predetermined second threshold X2 smaller than the first threshold X1 are compared. In this step, if the battery health X is below the second threshold X2, the corrected power selling amount may be calculated to be zero.

With this method, if the battery health X of the storage battery is below a predetermined value, power supply is stopped so that rapid deterioration of the storage battery can be suppressed.

In one aspect of the power supply/demand adjusting method disclosed here, in the step of calculating the incentive, if the battery health X acquired by the battery health acquisition controller exceeds the first threshold X1, an incentive to the desired power selling amount is calculated based on a first incentive grant rate, and an incentive to the excess amount is calculated based on a second incentive grant rate. The incentive to the excess amount may be calculated based on the second incentive grant rate higher than the first incentive grant rate.

With this method, a high incentive grant rate is set for an excess amount occurring if the battery health X of the storage battery is high. Thus, a user of a storage battery with a high battery health X is motivated to actively transmit electric power to the power supply/demand management device. Accordingly, power supply and demand can be more favorably adjusted.

In one aspect of the power supply/demand adjusting method disclosed here, in the step of calculating the incentive, a participation incentive to be provided to the user who sets the desired power selling amount in the step of acquiring the desired power selling amount is calculated.

With this configuration, even a user who does not know a battery health X of a storage battery can be motivated to participate in power supply/demand adjustment. Thus, a larger number of storage batteries can participate in power supply/demand adjustment. Accordingly, power supply and demand can be more favorably adjusted.

DETAILED DESCRIPTION

Figure 1:
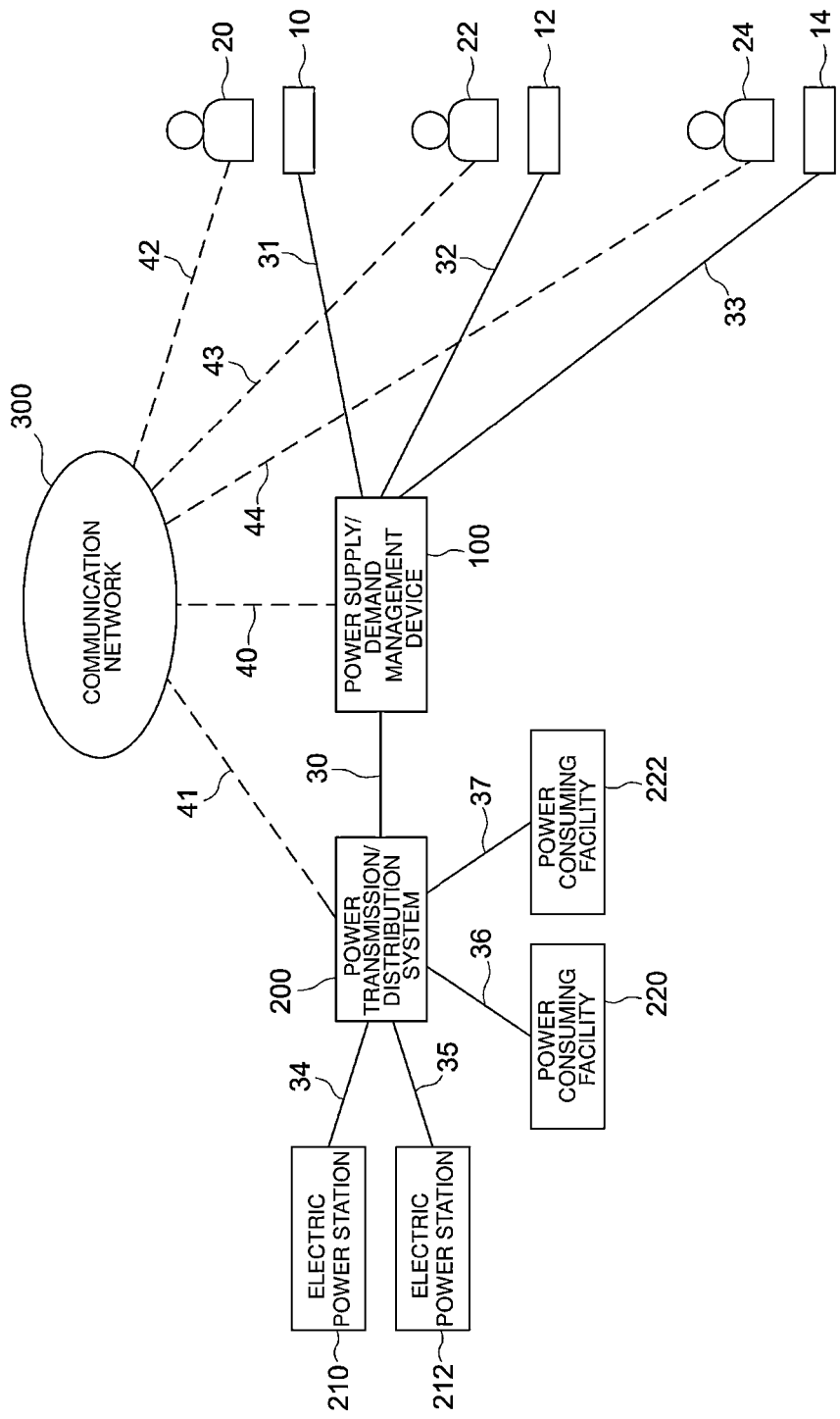
FIG. 1 schematically illustrates an example of application of a power supply/demand management device according to one preferred embodiment.

One preferred embodiment of a power supply/demand management device disclosed here will be described hereinafter with reference to the drawings. Matters not specifically mentioned herein but required for carrying out the present disclosure can be understood as matters of design variation of a person skilled in the art based on related art in the field. An embodiment described here is, of course, not intended to particularly limit the present disclosure. The present disclosure is not limited to the embodiment disclosed here unless otherwise specified.

First, an example of application of a power supply/demand management device 100 disclosed here will be described with reference to FIG. 1. The power supply/demand management device 100 encourages users 20, 22, and 24 of storage batteries 10, 12, and 14 to participate in power supply/demand adjustment in order to contribute to stabilization of a power supply/demand balance of a power transmission/distribution system 200. The power supply/demand management device 100 also appropriately manages power supply and demand between the storage batteries 10, 12, and 14 and the power transmission/distribution system 200. The power supply/demand management device 100 provides an incentive for motivating participation in power supply and demand in order to meet a power supply/demand request of the power transmission/distribution system 200, thereby contributing stabilization of a power supply/demand balance of the power transmission/distribution system 200. The users 20, 22, and 24 of the storage batteries 10, 12, and 14 supply electric power to the power transmission/distribution system 200 to thereby obtain an incentive (e.g., money or points) according to, for example, the amount of power supply (kWh).

An "incentive" herein is used for motivating a user of a storage battery to supply electric power to the power supply/demand management device 100, and is not specifically limited as long as the incentive can be adjusted for each user. The incentive may be money or so-called points exchangeable with products or others.

The "storage battery" herein refers to a device that stores electric power. The storage battery is capable of supplying stored electric power to the power transmission/distribution system 200. Examples of the storage battery include secondary batteries such as a lithium ion secondary battery and a nickel-metal hydride secondary battery, and power storage devices such as an electric double layer capacitor. The storage battery may be mounted as a driving power supply on a vehicle, or may be fixed as a power supply facility in a house or a commercial facility, for example.

The "user" can be an owner of a storage battery. The user herein is not limited to an owner of a storage battery, and may be any person who can use the storage battery, such as a family member of the user. Although FIG. 1 shows three storage batteries and three users, this example is simplified and is not intended to limit the numbers of storage batteries and users.

The "vehicle" herein refers to a type of transport equipment including a driving source. Examples of the vehicle that can be used in the technique disclosed here include a battery electric vehicle (BEV) including a storage battery as a driving source and a hybrid electric vehicle (HEV) including a storage battery and an internal combustion engine as a driving source. The "hybrid vehicle" herein includes a plug-in hybrid vehicle (PHEV) including a charging system from a stationary power supply to a storage battery. The vehicle preferably includes a communication device enabling bidirectional communication with a communication network 300 and an electronic control unit (ECU) capable of measuring battery healths X of the storage batteries 10, 12, and 14, for example.

As illustrated in FIG. 1, the power supply/demand management device 100 is connected to the power transmission/distribution system 200 by an electric wire 30 to enable power transmission and reception. The power supply/demand management device 100 can be connected to the storage batteries 10, 12, and 14 by electric wires 31, 32, and 33 such that electric power can be transmitted therebetween as appropriate.

The power transmission/distribution system 200 is connected to electric power stations 210 and 212 by electric wires 34 and 35 to receive electric power from the electric power stations 210 and 212. The electric power stations 210 and 212 include power generation facilities, and are not limited to specific facilities as long as the electric power stations 210 and 212 can supply electric power to the power transmission/distribution system 200. For example, the electric power stations 210 and 212 may be facilities each including a known power generation facility for, for example, thermal power generation, wind power generation, hydroelectric power generation, nuclear power generation, or solar power generation.

The power transmission/distribution system 200 is connected to power consuming facilities 220 and 222 by electric wires 36 and 37 to transmit electric power to the power consuming facilities 220 and 222. It is sufficient that the power consuming facilities 220 and 222 are facilities that consume electric power supplied from the power transmission/distribution system 200 and are not limited to specific facilities. Examples of the power consuming facilities include houses, commercial facilities, factories, and schools. Accordingly, the power transmission/distribution system 200 can supply electric power from the electric power stations 210 and 212 to the power consuming facilities 220 and 222.

The communication network 300 may be used for wired communication or wireless communication. Examples of the communication network 300 include communication networks such as the Internet, a cellular phone line, and a local area network (LAN). The power supply/demand management device 100 is connected by communication networks 40, 41, 42, 43, and 44 such that the power supply/demand management device 100 enables bidirectional communication with the power transmission/distribution system 200 and communication terminals (not shown) owned by the users 20, 22, and 24 through the communication network 300. The communication terminals only need to enable the users 20, 22, and 24 to perform bidirectional communication with the power supply/demand management device 100 and the power transmission/distribution system 200 through the communication network 300, and can be communication devices that can be installed in a cellular phone, a smartphone, a tablet, a laptop computer, a wearable terminal, or a vehicle, for example.

The configuration illustrated in FIG. 1 is used for a power supply/demand process between the power transmission/distribution system 200 and the users 20, 22, and 24 of the storage batteries 10, 12, and 14 through the power supply/demand management device 100. A summary of the power supply/demand process will be described with reference to FIG. 2.

When a power supply/demand balance of the power transmission/distribution system 200 is lost, the power transmission/distribution system 200 sends a power request to the power supply/demand management device 100 through the communication network 300 (see FIG. 1) (S1). The power request includes a requested power amount (kWh) requested by the power transmission/distribution system 200. Next, the power supply/demand management device 100 that has received the power request provides the power request to the users (S2). A user who confirmed the power request and wants to participate in a power selling process provides predetermined information necessary for the power selling process to the power supply/demand management device 100 (S3). The predetermined information includes, for example, a desired power selling amount and a battery health X described later. Thereafter, the power supply/demand management device 100 provides power selling information calculated based on the acquired predetermined information to each user (S4). The power selling information includes, for example, a power selling amount (kWh) supplied from the storage battery, an incentive based on the power selling amount (kWh). A user who agrees to the provided power selling information (e.g., the power selling amount and the incentive) electrically connects his/her storage battery to the power supply/demand management device 100 to supply predetermined electric power according to the power selling amount (S5). The power supply/demand management device 100 supplies electric power supplied from each storage battery to the power transmission/distribution system 200 (S6). The power supply/demand management device 100 provides an incentive according to the power selling amount (S7). Through this process, power supply/demand adjustment (power selling process) is established between the power transmission/distribution system 200 and the storage batteries 10, 12, and 14 through the power supply/demand management device 100.

The power supply/demand adjustment employing the power supply/demand management device 100 disclosed here is different from conventional power supply/demand adjustment in that in providing predetermined information to the power supply/demand management device 100 (S3), information including a battery health X and a desired power selling amount is provided, whereas in providing power selling information from the power supply/demand management device 100 (S4), a corrected power selling amount corrected based on the battery health X is issued. As described above, the power supply/demand management device 100 corrects a desired power selling amount set by a user of a storage battery based on the battery health X, and calculates an appropriate corrected power selling amount. That is, even in a case where a user sets a desired power selling amount not matching the battery health X of his/her storage battery, an appropriate corrected power selling amount is calculated, and the corrected power selling amount is supplied from the storage battery. Accordingly, rapid deterioration of the storage battery can be suppressed, and a power supply/demand balance can be suitably adjusted.

Figure 2:
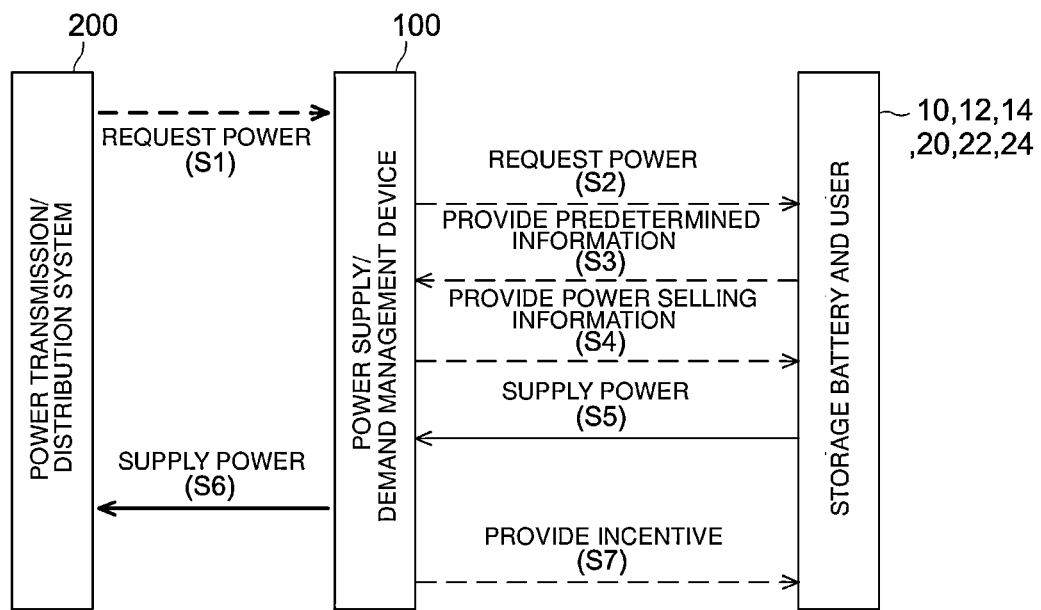
FIG. 2 shows a procedure of power supply/demand adjustment according to one preferred embodiment.
Figure 3:
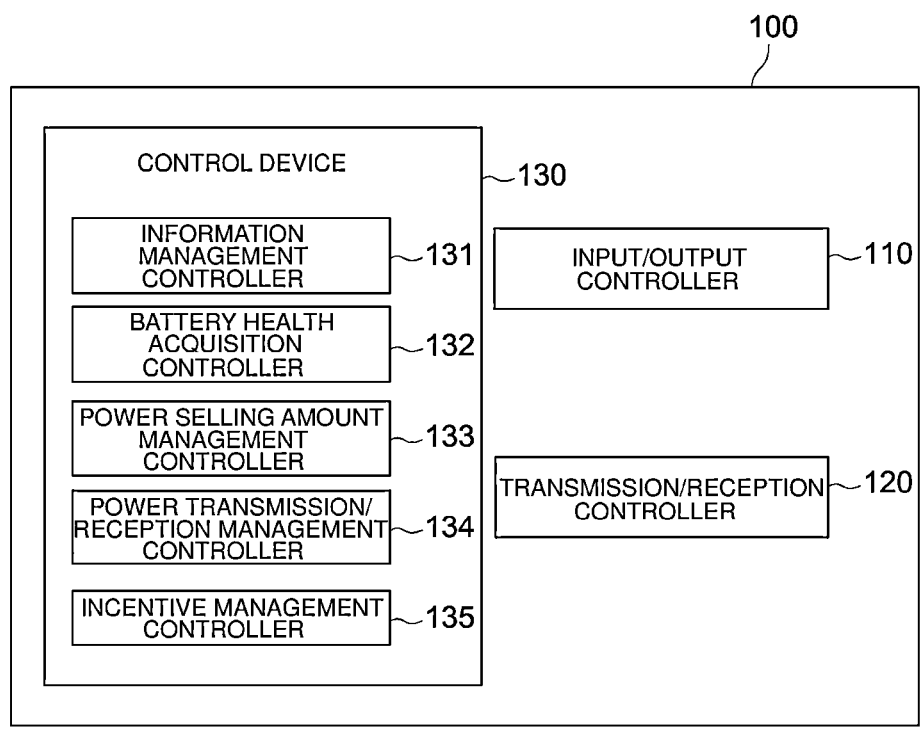
FIG. 3 schematically shows an example of a specific configuration of a power supply/demand management device according to one preferred embodiment.

Next, an example of a specific configuration of the power supply/demand management device 100 for achieving the process described with reference to FIG. 2 will be described. FIG. 3 generally illustrates the configuration of the power supply/demand management device 100. As illustrated in FIG. 3, the power supply/demand management device 100 includes an input/output controller 110 capable of acquiring predetermined information from the outside and providing the information to the outside, a transmission/reception controller 120 electrically connecting storage batteries to the power transmission/distribution system 200, and a controller 130 that controls a power supply process to achieve power supply and demand between the power transmission/distribution system 200 and the storage batteries.

The input/output controller 110 generally refers to equipment configured to acquire predetermined information from the outside and provide the predetermined information to the outside. Although not specifically limited, the input/output controller 110 may perform bidirectional communication through the communication network 300. For example, the input/output controller 110 may be connected to the communication network 300 through, for example, a communication service provided by a mobile communication provider. The input/output controller 110 may also enable direct input with, for example, a touch panel and direct display with, for example, a display device.

The transmission/reception controller 120 generally refers to equipment electrically connecting the storage batteries 10, 12, and 14 to the power transmission/distribution system 200. The transmission/reception controller 120 includes, for example, power plugs to which storage batteries of the users can be electrically connected through the electric wires 31, 32, and 33 (see FIG. 1). The transmission/reception controller 120 receives electric power from the storage batteries and transmits electric power to the power transmission/distribution system 200 based on a signal from the control device 130. The transmission/reception controller 120 may also incorporate a battery capable of storing electric power therein.

The control device 130 controls a power supply process to thereby achieve power supply and demand between the power transmission/distribution system 200 and the storage batteries. The control device 130 generally refers to equipment that performs information processing in the power supply/demand management device 100. The control device 130 may be constituted by a computation device stored in the power supply/demand management device 100. The computation device is constituted by, for example, a microcomputer. A hardware configuration of the microcomputer may include, but is not limited to, a read only memory (ROM) storing a program for control, a central processing unit (CPU) capable of executing the program, a random access memory (RAM) used as a working area where the program is developed, a memory device such as a memory for storing the program and various types of data, and input and output ports, for example. The control device 130 receives an output signal from the input/output controller 110 through the input port. The control device 130 acquires predetermined information based on an output signal from the input/output controller 110.

The control device 130 may not be a computation device physically stored in the power supply/demand management device 100. For example, in a case where the power supply/demand management device 100 is connected to an external computer to enable data communication through a LAN cable or the Internet, for example, the external computer may serve as the control device 130 of the power supply/demand management device 100 to control power supply and demand. Processing of the control device 130 may be performed by a plurality of computers in cooperation. For example, a computation device in the power supply/demand management device 100 may process information stored in, for example, a server on a network to control power supply and demand. Alternatively, processing to be executed by the control device 130 may be performed by a computation device in the power supply/demand management device 100 and an external compute in cooperation. The "external computer" herein may be a control device attached to a target storage battery. In a case where a storage battery is mounted on a vehicle, for example, an electronic control unit (e.g., an ECU) of the vehicle may be used as a part of the control device 130. The ECU of the vehicle can function as a battery health acquisition controller 132.

The power supply/demand management device 100 disclosed here includes a battery health acquisition controller 132, a power selling amount management controller 133, a power transmission/reception management controller 134, and an incentive management controller 135. The configuration illustrated in FIG. 3 includes these components as a part of the function of the control controller 130.

The control device 130 illustrated in FIG. 3 also includes an information management controller 131 as well as the battery health acquisition controller 132, the power selling amount management controller 133, the power transmission/reception management controller 134, and the incentive management controller 135. The information management controller 131 manages input and output of information acquired from the outside. The information management controller 131 is configured or programmed to acquire and store information necessary for managing a power request and a power selling request, for example. The information necessary for managing a power request can be, for example, a requested power amount (kWh), a time frame in which electric power is to be supplied, and positional information of the power transmission/distribution system 200. Examples of the information necessary for managing a power selling request include intention to sell electric power, a desired time frame, a storage battery from which electric power is to be sold, the type of the storage battery, personal information such as the name and address of a user, and current positional information of the user.

The information management controller 131 may be configured or programmed to register a user who requests to sell electric power as an applicant for a power seller, assign a power seller ID (identifier) to each user who requests to sell electric power. The information management controller 131 may be configured or programmed to create a power seller list. The information management controller 131 may be configured or programmed to assign a storage battery ID to a storage battery requested as a storage battery from which a user sells electric power, and store the storage battery ID in the power seller list in association with the power seller ID.

The information management controller 131 may output information to an external device when necessary. For example, the information management controller 131 can instruct the input/output controller 110 to process the acquired information concerning a power request and a power selling request and transmit necessary information to users of storage batteries. The information to be transmitted to the users of the storage batteries preferably include a place and a time zone of power selling, for example.

The battery health acquisition controller 132 is configured or programmed to acquire (estimate) a battery health X of each storage battery. The "battery health X of a storage battery" herein is a value indicating a deterioration degree of the storage battery. The battery health X of a storage battery may be a value calculated based on at least one of a resistance increase rate of the storage battery, a capacity retention rate, a temperature, years of use of the storage battery, or the number of charging/discharging, for example, and may be a value calculated based on a plurality of pieces of information concerning the state of the storage battery. More preferably, the battery health X of the storage battery may be a value based on at least one of a resistance increase rate of the storage battery, a capacity retention rate, or a temperature.

The resistance increase rate of a storage battery refers to a proportion of an internal resistance of the storage battery in measurement to an internal resistance of the storage battery in an initial state. A method for acquiring (estimating) a resistance increase rate of a storage battery is not specifically limited, and may be a known method that can be used in measuring a resistance increase rate of a storage battery of this type. For example, examples of the method for acquiring an internal resistance of a storage battery include a method for acquiring an internal resistance of a storage battery by dividing a voltage change in charging/discharging the storage battery by a change of a current value at this time based on various types of data detected by a voltage sensor and a current sensor (i.e., a method of linearly approximating a parameter of a current change amount and a parameter based on a voltage change amount and an impedance change amount and calculating a slope of the approximated line as an impedance of the storage battery). An initial internal resistance of the storage battery is subtracted from the thus-obtained internal resistance of the storage battery, thereby calculating a resistance increase rate of the storage battery. As the initial internal resistance value of the storage battery, a value measured in an initial state of a target storage battery may be employed, or an initial internal resistance of a secondary battery produced by a manufacturer of a similar type of a secondary battery is acquired and employed by referring to the acquired type of the target storage battery, for example.

The capacity retention rate of the storage battery refers to a proportion of a battery capacity of the storage battery in measurement to a battery capacity of the storage battery in an initial state. A method for acquiring (estimating) a capacity retention rate is not specifically limited, and may be a known method that can be used in measuring a capacity retention rate of a storage battery of this type Examples of the method for acquiring a battery capacity of a storage battery include a method of estimating a battery capacity of a secondary battery according to a battery model based on various types of data detected by, for example, a voltage sensor, a current sensor, and a temperature sensor (e.g., a method of storing previously obtained open circuit voltage characteristics of a positive electrode and a negative electrode of the storage battery, and with reference to the stored data and data detected by, for example, the voltage sensor, the current sensor, and the temperature sensor, extracting the amounts of active materials in the positive electrode and the negative electrode, a capacity density, and a resistance, and estimating a battery capacity of the storage battery using the extracted parameters). The capacity retention rate of the storage battery can be calculated by subtracting the battery capacity of the storage battery acquired as described above from an initial battery capacity of the storage battery. As the initial battery capacity of the storage battery, a value measured in an initial state of a target storage battery may be employed, or an initial battery capacity of a storage battery produced by a manufacturer of a similar type of a secondary battery is acquired and employed by referring to the acquired type of the target storage battery, for example.

The temperature of the storage battery can be acquired by, for example, a temperature sensor. The number of charging/discharging of the storage battery can be acquired by storing the number of charging of the storage battery. The battery health X of the storage battery described above may be a value acquired (estimated) by the battery health acquisition controller 132, or may be a value such as a resistance increase rate acquired (estimated) by, for example, a control device that can be included in the storage battery. Alternatively, in a case where the storage battery is mounted on a vehicle, a value such as a resistance increase rate acquired (estimated) in an electronic control unit (e.g., ECU) that can be mounted on the vehicle. The battery health acquisition controller 132 stores the battery health X of each storage battery in the power seller list described above in association with the storage battery ID, for example.

The power selling amount management controller 133 is configured or programmed to correct a desired power selling amount (kWh) set by each of the users 20, 22, and 24 based on the battery health X and calculate a corrected power selling amount (kWh). As information necessary for calculating the corrected power selling amount, the battery health X and the desired power selling amount (kWh) are input to the power selling amount management controller 133. A method for calculating the corrected power selling amount will be specifically described later. The power selling amount management controller 133 stores the corrected power selling amount of each storage battery in the power seller list in association with the power seller ID.

The "desired power selling amount (kWh)" here is a value that can be freely set by each user. The "corrected power selling amount (kWh)" is a value calculated by correcting the desired power selling amount (kWh) based on the battery health X. The corrected power selling amount (kWh) is a power amount (kWh) substantially supplied from each storage battery to the power supply/demand management device 100.

The power transmission/reception management controller 134 is configured or programmed to manage the amount of power received from the storage battery and the amount of power sent to the power transmission/distribution system 200. The power transmission/reception management controller 134 receives information necessary for managing the amount of received/transmitted power of the power supply/demand management device 100, such as a requested power amount from the power transmission/distribution system 200, the amount of received power from each storage battery, the amount of transmitted power to the power transmission/distribution system 200. The power transmission/reception management controller 134 can manage the amount of received power from each storage battery in real time. When the amount of received power reaches the requested power amount of the power transmission/distribution system 200, the power transmission/reception management controller 134 transmits an instruction of finishing reception of power from each storage battery to the input/output controller 110, and notifies a communication terminal or the like of a user of each storage battery through the communication network 300, for example.

The incentive management controller 135 is configured or programmed to calculate an incentive to be provided to a user of each storage battery based on the corrected power selling amount. As information for calculating an incentive, the incentive management controller 135 receives, for example, the corrected power selling amount and the incentive grant rate. The incentive management controller 135 calculates an incentive based on the information, and transmits information concerning this incentive to the input/output controller 110. Then, the input/output controller 110 provides an incentive to the user of each storage battery through the communication network 300, for example. A method for calculating an incentive will be specifically described later.

The power supply/demand management device 100 with the configuration describe above can achieve the power supply/demand process described with reference to FIG. 2. The configuration described above shows one example of the specific configuration of the power supply/demand management device 100 disclosed here, and the present disclosed is not limited to this configuration. The input/output controller 110 and the transmission/reception controller 120 may be constituted by controllers (devices) including alternative functions.

Figure 4:
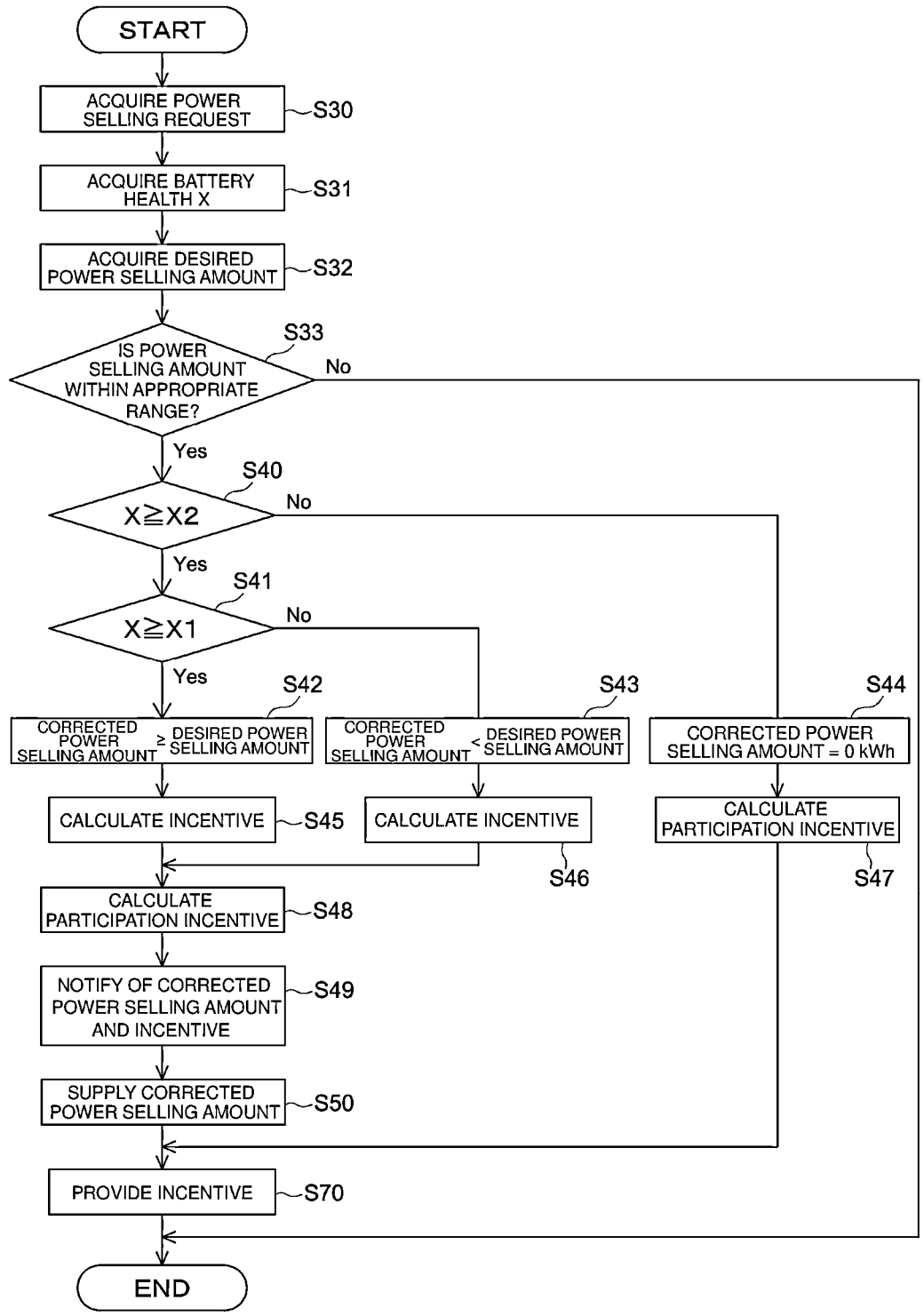
FIG. 4 is a flowchart depicting a procedure of a power supply/demand management device according to one preferred embodiment.

A procedure in the power supply/demand management device 100 will now be described. FIG. 4 is a flowchart depicting a process by the power supply/demand management device 100. To achieve a power selling process according to a battery health X, the power supply/demand management device 100 disclosed here performs steps S3, S4, S5, and S7 in FIG. 2 as follows.

First, in step S3 of FIG. 2, the power supply/demand management device 100 disclosed here performs steps S30 to S33 below.

In step S30, a power selling request from a user of a storage battery is acquired. The power selling request may be transmitted from an unillustrated communication terminal of each user through the communication network 300 or may be directly input to the input/output controller 110. In a case where a storage battery is connected to a vehicle, the power selling request may be transmitted from, for example, a communication device installed in the vehicle through the communication network 300

In step S31, a battery health X is acquired for a target storage battery for which the power selling request is acquired. For example, a voltage change in charging/discharging is divided by a current value change at this time based on data detected by a voltage sensor and a current sensor, thereby estimating an internal resistance. An initial internal resistance is subtracted from the acquired internal resistance so that the amount of increased in internal resistance is calculated and a battery health X is acquired (estimated).

In step S32, a desired power selling amount (kWh) is acquired. The desired power selling amount can be set at any value by a user of each storage battery. For example, a user who actively wants to sell electric power sets a large desired power selling amount. On the other hand, a user who wants to sell a predetermined amount of electric power but is worried about deterioration of a storage battery can set a small desired power selling amount.

The desired power selling amount (kWh) may be input from an unillustrated communication terminal of each user through the communication network 300 or may be directly input to the input/output controller 110.

In step S33, it is determined whether the acquired desired power selling amount is within an appropriate range or not. The appropriate range herein means that the acquired desired power selling amount is within a maximum capacity of a target storage battery, for example. Thus, a maximum amount estimated from the type of a storage battery input at a power selling request and a desired power selling amount acquired from a user are compared, for example, and if the desired power selling amount is within the appropriate range, for example, below the maximum capacity of the target storage battery (S33: YES), the process proceeds to step S40. At the acquisition of the power selling request, the capacity that can be input as a desired power selling amount (i.e., a desired power selling amount within the appropriate range) may be displayed on, for example, the input/output controller 110.

If the desired power selling amount is not within the appropriate range, for example, exceeds the maximum capacity of the target storage battery (S33: NO), it is determined that an abnormal input is made, and the process is finished.

In S4 of FIG. 2, first, steps S40 to S44 described below are performed. In steps S40 to S44, the desired power selling amount is corrected based on the acquired battery health X and a corrected power selling amount is calculated. The corrected power selling amount (kWh) may be, but is not limited to, a value calculated from the product of the desired power selling amount (kWh) and the battery health correction factor Y, for example.

In step S40, the battery health X of a target storage battery and a predetermined second threshold X2 are compared. If the battery health X of the storage battery exceeds the second threshold X2 (S40: YES), the process proceeds to step S41.

The second threshold X2 will now be described. As described above, in the power supply/demand management device 100 disclosed here, to suppress excessive deterioration of a storage battery, a corrected power selling amount is calculated based on the battery health X of the storage battery. The second threshold X2 is set as a criterion for determining whether power supply form the storage battery can be performed or not. Although the second threshold X2 is not uniformly defined because of difference in the type and application among storage batteries, any value may be set with reference to a capacity retention rate at which each storage battery needs to be replaced.

Figure 5:
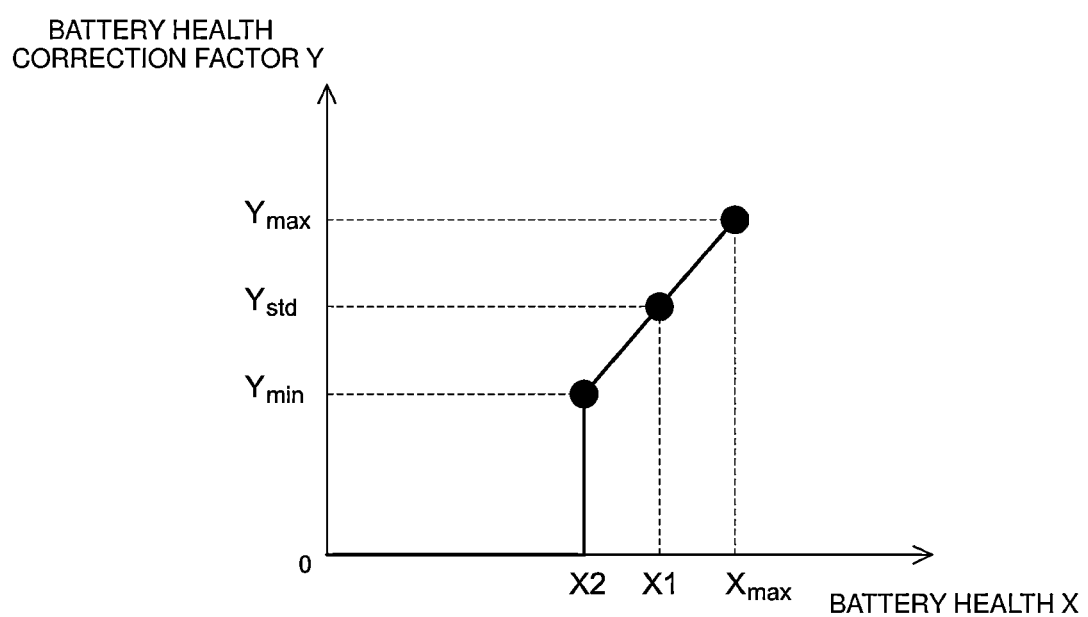
FIG. 5 shows a relationship between a battery health X and a battery health correction factor Y according to one preferred embodiment.

If the battery health X of a storage battery is below the second threshold X2 (S40: NO), the state of the storage battery tends to be poor, and power supply from the storage battery should be stopped in order to suppress rapid deterioration. Thus, as shown in FIG. 5, if the battery health X of the storage battery is below the second threshold X2, the battery health correction factor Y is zero. If the battery health X of the storage battery is below the second threshold X2 (S40: NO), the process proceeds to step S44. In step S44, the corrected power selling amount is calculated to be zero (kWh). Accordingly, power supply from the storage battery is substantially stopped.

In step S41, the battery health X of the target storage battery and a predetermined first threshold X1 are compared. As shown in FIG. 5, the first threshold X1 is larger than the second threshold X2. The first threshold X1 is set as a criterion for determining whether addition or subtraction is to be performed with respect to the desired power selling amount in calculating a corrected power selling amount for a storage battery whose battery health X exceeds the second threshold X2 and from which electric power can be sold. Although the first threshold X1 is not uniformly defined because of difference in the type and application among storage batteries, any value may be set with reference to a capacity retention rate when a half of the lifetime of each storage battery has elapsed, for example. In the case of a storage battery whose capacity retention rate at the end of lifetime is 70%, the reference value is 85%.

If the battery health X of the storage battery exceeds the first threshold X1 (S41: YES), the storage battery is in an especially good state, and thus, a power selling process exceeding the desired power selling amount is to be performed. Thus, as shown in FIG. 5, the battery health correction factor Y exceeds a reference value $Y_{std}$. The reference value $Y_{std}$ here is one (i.e., a power selling amount as desired by a user).

Figure 6:
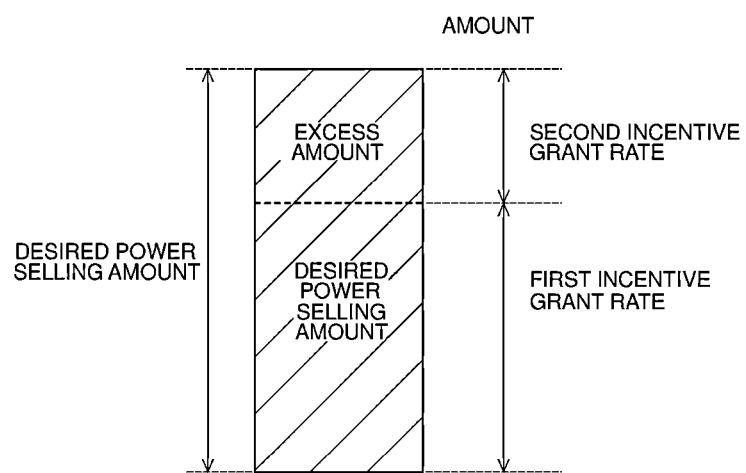
FIG. 6 shows an example of a corrected power selling amount and an incentive grant rate according to one preferred embodiment.

If the battery health X of the storage battery exceeds the first threshold X1 (S41: YES), the process proceeds to step S42. In step S42, the corrected power selling amount is calculated as a value obtained by adding an excess amount to the desired power selling amount. Specifically, if the battery health X of the storage battery exceeds the first threshold X1, as shown in FIG. 6, the corrected power selling amount is calculated as a value obtained by adding an excess amount to the desired power selling amount.

If the battery health X of the storage battery is equal to the first threshold X1, step S42 is performed for convenience. In this case, the excess amount is zero, and the corrected power selling amount is calculated as a value equal to the desired power selling amount.

On the other hand, if the battery health X of the storage battery is below the first threshold X1 (S41: NO), the storage battery is in a state in which electric power can be sold from the storage battery, but selling of electric power should be suppressed from the viewpoint of suppressing rapid deterioration. Thus, the battery health correction factor Y is less than the reference value $Y_{std}$.

Figure 7:
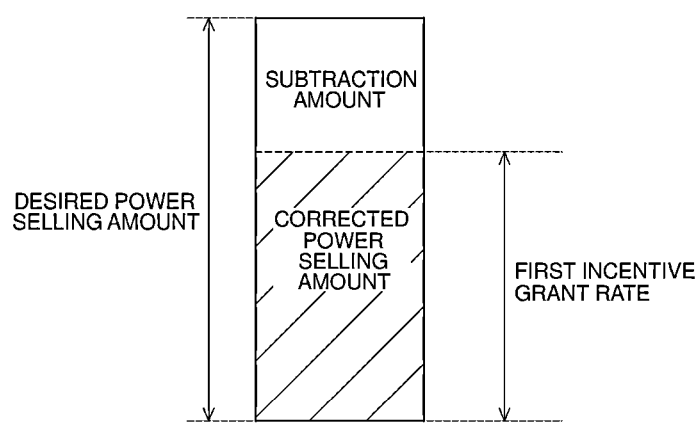
FIG. 7 shows another example of a corrected power selling amount and an incentive grant rate according to one preferred embodiment.

If the battery health X of the storage battery is below the first threshold X1 (S41: NO), the process proceeds to step S43. In step S43, the corrected power selling amount is calculated as a value obtained by subtracting a subtraction amount from the desired power selling amount. Specifically, if battery health X of the storage battery is below the first threshold X1, as shown in FIG. 7, the corrected power selling amount is calculated as a value obtained by subtracting the subtraction amount from the desired power selling amount.

Specifically, the battery health correction factor Y can be calculated from Equation (1):

$$Y = \frac{(Y_{max} - Y_{std})}{(X_{max} - X1)} \times (X - X1) + Y_{std} \quad (1)$$

where the battery health correction factor $Y_{max}$ in Equation (1) is a battery health correction factor when the battery health X is at maxim ($X_{max}$).

As described above, the corrected power selling amount is calculated based on the battery health X of the storage battery so that it is possible to prevent excessive supply of electric power from a storage battery whose acquired battery health X is below the first threshold X1. A storage battery whose acquired battery health X exceeds the first threshold X1 can supply a larger amount of electric power than the desired power selling amount, and thus, a requested power amount can be efficiently obtained.

Thereafter, in S4 of FIG. 2, steps S45 to S47 are performed as follows. Steps S45 to S47 are steps for calculating an incentive based on the corrected power selling amount. The incentive may be, but is not limited to, a value calculated from the product of a corrected power selling amount and an incentive grant rate.

The "incentive grant rate" herein is a factor used in calculating an incentive to be granted. As the incentive grant rate increases, an incentive such as money or points to be returned to a user increases. The incentive grant rate may be a value that is appropriately set by the incentive management controller 135.

In step S45, as shown in FIG. 6, preferably, if the battery health X exceeds the first threshold X1, an incentive to the desired power selling amount is calculated based on a first incentive grant rate, and an incentive to the excess amount is calculated based on a second incentive grant rate, where the second incentive grant rate is higher than the first incentive grant rate. Accordingly, an incentive at a rate higher than that in a case where electric power is sold without an excess amount is provided to a user of a storage battery whose battery health X exceeds the first threshold X1 and from which electric power is sold with an excess amount. Consequently, the user of the storage battery whose battery health X exceeds the first threshold X1 is encouraged to sell electric power to the power supply/demand management device 100.

In step S46, as shown in FIG. 7, if the battery health X is below the first threshold X1, an incentive to the corrected power selling amount is preferably calculated based on the first incentive grant rate. Accordingly, even if the battery health X of the storage battery is below the first threshold X1, a user of this storage battery is motivated to participate in power supply/demand adjustment.

In step S47, since the corrected power selling amount is calculated to be zero as described above, no incentive based on the corrected power selling amount is calculated, and only a participation incentive described later is calculated. Then, only the participation incentive is provided in step S70, and the power selling process is finished.

Step S48 is optional. In step S48, a participation incentive is calculated to a user of a storage battery for which a desired power selling amount within the appropriate range is set. The participation incentive may be money or points, for example. The participation incentive is preferably lower than an incentive to be calculated in step S45 and step S46. Since the participation incentive is calculated as described above, even a user who does not know a battery health X of his/her storage battery can be motivated to participate in power supply/demand adjustment.

Lastly, in S4 of FIG. 2, step S49 is performed as follows. In step S49, notification of the corrected power selling amount (kWh) and the incentive calculated as described above are issued. The notification can be issued from, for example, the input/output controller 110 to communication terminals of users through the communication network 300.

In S5 of FIG. 2, step S50 is performed as follows. In step S50, a user whose agrees to the presented power selling information (the corrected power selling amount and the incentive) connects his/her storage battery to the transmission/reception controller 120 to thereby supply predetermined electric power in accordance with the corrected power selling amount to the power supply/demand management device 100. Electric power supplied from the storage battery is supplied to the power transmission/distribution system 200.

In S7 of FIG. 2, step S70 is performed as follows. In step S70, the calculated incentive is granted to each user. The grant method is not specifically limited, and for example, points, for example, may be provided to communication terminals of users through the communication network 300.

In the configuration described above, for the desired power selling amount set by a user of each storage battery, a corrected power selling amount is calculated based on the acquired battery health X of the storage battery. At this time, a storage battery whose battery health X is low (i.e., is below the first threshold X1) is under a heavy load due to power supply, and deterioration of this storage battery might rapidly progress. Thus, a small corrected power selling amount is set. A storage battery health whose battery health X is much lower (i.e., below the second threshold X2) is in a state where electric power should not be supplied from this storage battery, and thus, the corrected power selling amount is calculated to be zero, and power supply form the storage battery is stopped. On the other hand, a storage battery whose battery health X is high (i.e., exceeds the first threshold X1) is under a relatively small load due to power supply, and deterioration of this storage battery is less likely to proceed rapidly, and thus, a large corrected power selling amount is set. Thus, the desired power selling amount set by the user of the storage battery is corrected based on the battery health X, and an appropriate corrected power selling amount is calculated. That is, even in a case where a user sets a desired power selling amount not the matching battery health X of his/her storage battery, an appropriate corrected power selling amount is calculated, and the corrected power selling amount is supplied from the storage battery. Accordingly, rapid deterioration of the storage battery can be suppressed, and a power supply/demand balance can be suitably adjusted.

Specific examples of the present disclosure have been described in detail hereinbefore, but are merely illustrative examples, and are not intended to limit the scope of claims. The techniques described in claims include various modifications and changes of the above exemplified specific examples.

What is claimed is:

1. A power supply/demand management device configured or programmed to manage power supply and demand between a power transmission/distribution system and a storage battery, the power supply/demand management device comprising:

a battery health acquisition controller configured or programmed to acquire a battery health X of the storage battery;

a power selling amount management controller configured or programmed to acquire a desired power selling amount and correct the acquired desired power selling amount by calculating a corrected power selling amount based on the acquired battery health X, the desired power selling amount being an amount of electric power set by a user of the storage battery, and the corrected power selling amount being an amount of electric power to be supplied from the storage battery to the power transmission/distribution system;

a power transmission/reception management controller configured or programmed to manage an amount of power transmitted from the storage battery to the power transmission/distribution system, based on the corrected power selling amount; and an incentive management controller configured or programmed to calculate an incentive to be provided to the user of the storage battery based on the corrected power selling amount, wherein the power selling amount management controller is further configured to store a predetermined first threshold X1 and a predetermined second threshold X2 as a value smaller than the first threshold X1, the power selling amount management controller is further configured to compare the battery health X acquired by the battery health acquisition controller and the second threshold X2, in response to the battery health X being below the second threshold X2, the power selling amount management controller calculates the corrected power selling amount to be zero, and the incentive management controller is further configured to provide a participation incentive to the user who sets the desired power selling amount, and in response to the battery health X equal to or exceeding the second threshold X2, the power selling amount management controller is further configured to compare the battery health X acquired by the battery health acquisition controller and the first threshold X1, in response to the battery health X equal to or exceeding the first threshold X1, the power selling amount management controller calculates the corrected power selling amount as a value obtained by adding an excess amount to the desired power selling amount, the incentive management controller calculates a first incentive to the desired power selling amount based on a first incentive grant rate, and calculates a second incentive to the excess amount based on a second incentive grant rate higher than the first incentive grant rate and the incentive management controller provides the first incentive, the second incentive, and the participation incentive to the user who sets the desired power selling amount, and in response to the battery health X being below the first threshold X1, the power selling amount management controller calculates the corrected power selling amount as a value obtained by subtracting a subtraction amount from the desired power selling amount, the incentive management controller calculates a third incentive to the corrected power selling amount based on the first incentive grant rate, and the incentive management controller provides the third incentive and the participation incentive to the user who sets the desired power selling amount.

2. The power supply/demand management device according to claim 1, wherein the battery health X is a value based on at least one of a resistance increase rate, a capacity retention rate, or a temperature of the storage battery.

3. The power supply/demand management device according to claim 1, wherein the storage battery is mounted as a driving source on a vehicle, and is electrically connected to the storage battery through an electric circuit of the vehicle to thereby perform transmission and reception of electric power.

4. The power supply/demand management device according to claim 1, wherein the power selling amount management controller is further configured to compare the acquired desired power selling amount and a maximum capacity of the storage battery, in response to the acquired desired power selling amount being below the maximum capacity of the storage battery, a process proceeds, and in response to the acquired desired power selling amount exceeding the maximum capacity of the storage battery, the process is finished.

5. A power supply/demand adjusting method for adjusting power supply and demand between a power transmission/distribution system and a storage battery, the method comprising the steps of:

acquiring a battery health X of the storage battery;

acquiring a desired power selling amount, the desired power selling amount being an amount of electric power set by a user of the storage battery;

correcting the desired power selling amount by calculating a corrected power selling amount based on the acquired battery health X;

supplying electric power from the storage battery to the power transmission/distribution system based on the corrected power selling amount;

calculating an incentive to be provided to the user of the storage battery based on the corrected power selling amount; and providing the calculated incentive to the user of the storage battery, wherein in the step of calculating the corrected power selling amount, the battery health X acquired in the battery health acquiring step and a predetermined second threshold X2 smaller than a first threshold X1 are compared, in response to the battery health X being below the second threshold X2, in the step of calculating the corrected power selling amount, the corrected power selling amount is set to zero, and in the step of providing the incentive, a participation incentive is provided to the user who sets the desired power selling amount, and in response to the battery health X equal to or exceeding the second threshold X2, the battery health X acquired in the battery health acquiring step and the predetermined first threshold X1 are compared in the step of calculating the corrected power selling amount, in response to the battery health X equal to or exceeding the first threshold X1, in the step of calculating the corrected power selling amount, the corrected power selling amount is calculated as a value obtained by adding an excess value to the desired power selling amount, in the step of calculating the incentive, a first incentive to the desired power selling amount is calculated based on a first incentive grant rate, and a second incentive to the excess amount is calculated based on a second incentive grant rate higher than the first incentive grant rate, and in the step of providing the incentive, the first incentive, the second incentive, and the participation incentive are provided to the user who sets the desired power selling amount, and in response to the battery health X being below the first threshold X1, in the step of calculating the corrected power selling amount, the corrected power selling amount is calculated as a value obtained by subtracting a subtraction amount from the desired power selling amount, in the step of calculating the incentive, a third incentive to the corrected power selling amount based on the first incentive grant rate, and in the step of providing the incentive, the third incentive and the participation incentive are provided to the user who sets the desired power selling amount.

6. The power supply/demand adjusting method according to claim 5, further comprising the step of comparing the acquired desired power selling amount and a maximum capacity of the storage battery, after the step of acquiring the desired power selling amount, in response to the acquired desired power selling amount being below the maximum capacity of the storage battery, a process proceeds, and in response to the acquired desired power selling amount exceeding the maximum capacity of the storage battery, the process is finished.

* * * * *